(12) United States Patent
Abotabl et al.

(10) Patent No.: US 12,484,066 B2
(45) Date of Patent: Nov. 25, 2025

(54) SCHEDULING DOWNLINK CONTROL INFORMATION (DCI) IN SUB-BAND FULL-DUPLEX (SBFD) SLOTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 597 days.

(21) Appl. No.: 17/894,959

(22) Filed: Aug. 24, 2022

(65) Prior Publication Data

US 2024/0073911 A1   Feb. 29, 2024

(51) Int. Cl.
*H04L 5/00* (2006.01)
*H04L 5/14* (2006.01)
*H04W 72/0446* (2023.01)
*H04W 72/0453* (2023.01)
*H04W 72/23* (2023.01)

(52) U.S. Cl.
CPC .............. *H04W 72/23* (2023.01); *H04L 5/14* (2013.01); *H04W 72/0446* (2013.01)

(58) Field of Classification Search
CPC .............. H04W 72/23; H04W 72/045; H04W 72/0453; H04L 5/14; H04L 5/0094; H04L 5/0053
See application file for complete search history.

(56) References Cited

U.S. PATENT DOCUMENTS

| 2021/0352667 | A1   | 11/2021 | Abotabl et al.          |
| 2021/0360664 | A1   | 11/2021 | Fakoorian et al.        |
| 2021/0377938 | A1   | 12/2021 | Huang et al.            |
| 2022/0046679 | A1 * | 2/2022  | Yeo ............... H04L 1/1896 |
| 2022/0104245 | A1 * | 3/2022  | Xu ................ H04L 5/0053 |
| 2022/0338265 | A1 * | 10/2022 | Lei ............... H04L 1/0061 |
| 2023/0180164 | A1 * | 6/2023  | Kim ............... H04W 56/0045 |
|              |      |         | 370/324                 |

(Continued)

FOREIGN PATENT DOCUMENTS

WO   WO-2022155600 A2 *   7/2022   ......... H04L 27/2602

OTHER PUBLICATIONS

3GPP TSG-RAN WG1 Meeting#89, R1-1709096 Title:On MCS/ transport Block Size Determination for PUSCH (Year: 2017).*

(Continued)

*Primary Examiner* — Faruk Hamza
*Assistant Examiner* — Abusayeed M Haque
(74) *Attorney, Agent, or Firm* — Seyfarth Shaw LLP

(57) ABSTRACT

A method for wireless communication by a user equipment (UE) includes receiving a configuration of a downlink bandwidth part (BWP). The method also includes receiving a frequency domain resource allocation (FDRA) in a slot. The FDRA includes a first type of bits corresponding to a downlink allocation within the downlink BWP and a second type of bits corresponding to either a known sequence or repeated bits. The method further includes communicating in accordance with the FDRA.

28 Claims, 12 Drawing Sheets

(56) References Cited

U.S. PATENT DOCUMENTS

2024/0056277 A1\* 2/2024 Abotabl ............... H04W 72/23

OTHER PUBLICATIONS

3GPP TSG RAN WG1 Meeting#94, R1-1809061 Title:Frame structure fo rNr-U operation (Year: 2018).\*

International Search Report and Written Opinion—PCT/US2023/029558—ISA/EPO—Nov. 29, 2023.

Qualcomm Incorporated: "Feasibility and Techniques for Subband Non-Overlapping Full Duplex", 3GPP TSG RAN WG1, Meeting #110, R1-2207231, 3rd Generation Partnership Project, Toulouse, Aug. 22, 2022-Aug. 26, 2022, Aug. 13, 2022, pp. 1-28.

\* cited by examiner

SCHEDULING DOWNLINK CONTROL INFORMATION (DCI) IN SUB-BAND FULL-DUPLEX (SBFD) SLOTS

FIELD OF THE DISCLOSURE

The present disclosure relates generally to wireless communications, and more specifically to enhancing decodability when scheduling downlink control information (DCI) in sub-band full-duplex (SBFD) slots.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method for wireless communication by a user equipment (UE) includes receiving a configuration of a downlink bandwidth part (BWP). The method also includes receiving a frequency domain resource allocation (FDRA) in a slot. The FDRA includes a first type of bits corresponding to a downlink allocation within the downlink BWP and a second type of bits corresponding to either a known sequence or repeated bits. The method further includes communicating in accordance with the FDRA.

In other aspects of the present disclosure, a method of wireless communication by a network device includes configuring a BWP. The method also includes transmitting an FDRA in a slot. The FDRA includes a first type of bits corresponding to a downlink allocation, the downlink allocation falling within the downlink BWP, and a second type of bits corresponding to either a known sequence or repeated bits. The method further includes communicating in accordance with the FDRA.

Other aspects of the present disclosure are directed to an apparatus for wireless communication. The apparatus has a memory and at least one processor(s) coupled to the memory. The processor(s) is configured to receive a configuration of a downlink bandwidth part (BWP). The processor(s) is also configured to receive a frequency domain resource allocation (FDRA) in a slot. The FDRA includes a first type of bits corresponding to a downlink allocation within the downlink BWP and a second type of bits corresponding to either a known sequence or repeated bits. The processor(s) is further configured to communicate in accordance with the FDRA.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
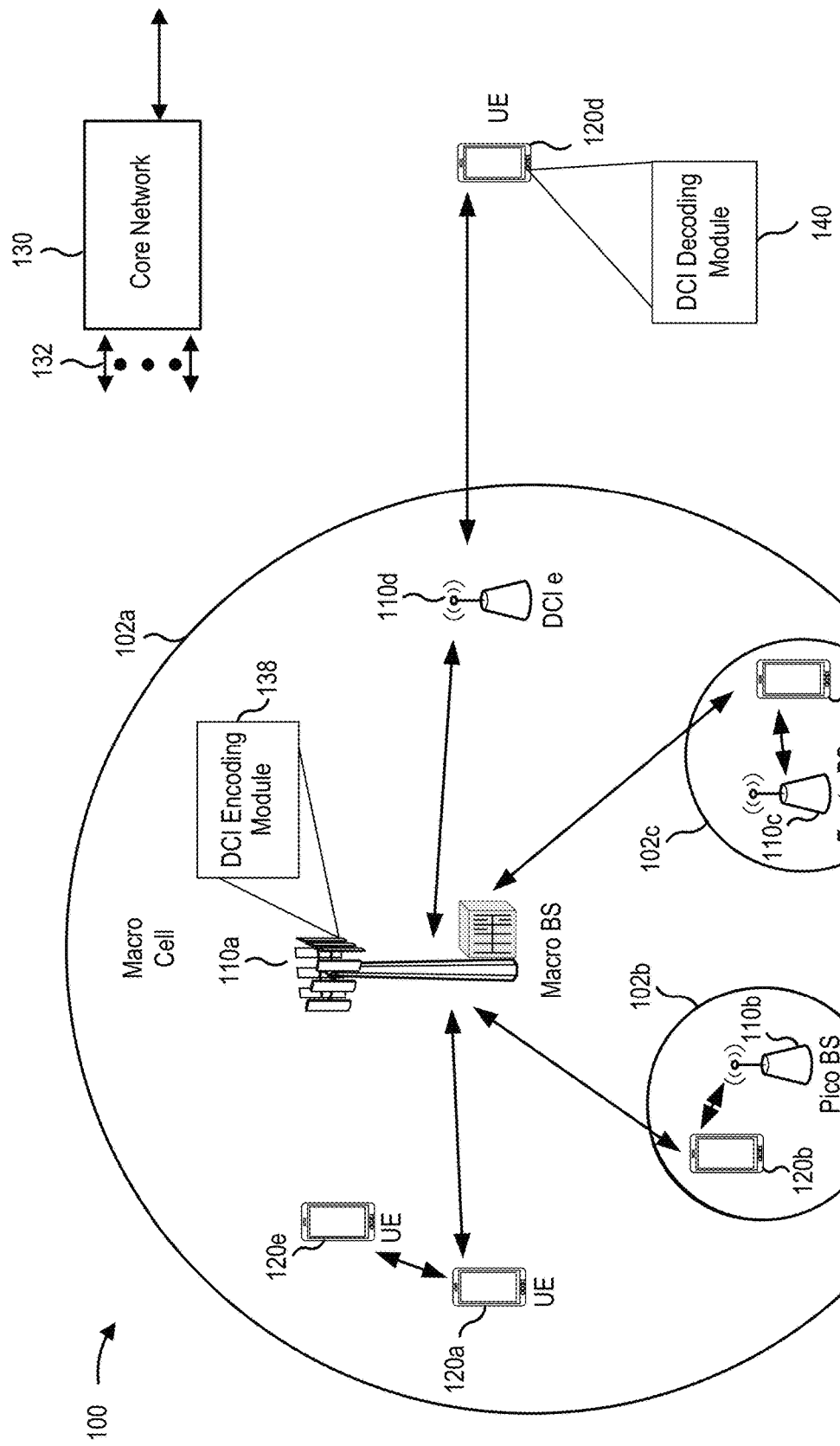
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Sub-band full-duplex (SBFD) slots contain resources for both downlink and uplink communications, as well as potentially a guard band between the downlink and uplink resources. The SBFD slots enable simultaneous transmission and reception by a device.

A frequency domain resource allocation (FDRA) allocates resource blocks (e.g., frequency sub-bands) for each transmission and reception. Due to varying frequency allocations, only a portion of a configured bandwidth part (BWP) may overlap with an allocated sub-band. For example, an allocated downlink sub-band may be located in a lower half of a frequency band while the configured downlink BWP spans the entire frequency band.

The FDRA is carried in downlink control information (DCI) and may include a bitmap or a resource indicator value (RIV). The bitmap or RIV may contain redundant bits if the BWP spans a larger bandwidth than the allocated (or useful) bandwidth. The bitmap and RIV are designed for the configured BWP, and not only the useful bandwidth.

Bits that fall outside of the configured BWP in a conflicting transmission direction are referred to as 'useless' bits. According to aspects of the present disclosure, redundant bits associated with the bitmap or RIV, if fixed and known to the user equipment (UE), may be used by the UE to improve a speed and reliability associated with decoding the DCI. That is, the UE can replace log likelihood ratios (LLRs) of corresponding useless bits to infinity and negative infinity. For example, the base station may transmit a fixed sequence in the useless bits that is either all zeros or any other sequence that is radio resource control (RRC) configured to the UE.

The redundant bits associated with the bitmap or RIV may also be used to repeat certain fields in the DCI and hence, improve the decodability. For example, if the number of useful bits is equal to the number of useless bits, all useful bits may be repeated. If the number of useful bits is larger than the number of useless bits, some of the useful bits may be repeated. If the number of useful bits is smaller than the number of useless bits, some of the useful bits may be repeated more than once. In some aspects, repetition may occur starting from a first bit of the bitmap, a second bit, or according to an RRC configured sequence. In case the BWP spans more than one disjoint band, the repeated bits may be either the bits in a lower sub-band, an upper sub-band, or a combination that may be RRC configured. In some aspects, the useless bits may be used to transmit repetition of other fields in the DCI, such as the time domain resource allocation (TDRA).

Aspects of the present disclosure improve transmission efficiency by avoiding transmission of one or more useless bits. Additionally, decodability can be improved, such that a UE decodes DCI faster and with higher reliability than with existing techniques.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a downlink control information (DCI) decoding module 140. For brevity, only one UE 120d is shown as including the DCI decoding module 140. The DCI decoding module 140 may receive a configuration of a downlink bandwidth part (BWP). The DCI decoding module 140 may also receive a frequency domain resource allocation (FDRA) in a slot. The FDRA includes a first type of bits corresponding to a downlink allocation within the downlink BWP and a second type of bits corresponding to either a known sequence or repeated bits. The DCI decoding module 140 may further communicate in accordance with the FDRA.

Figure 3:
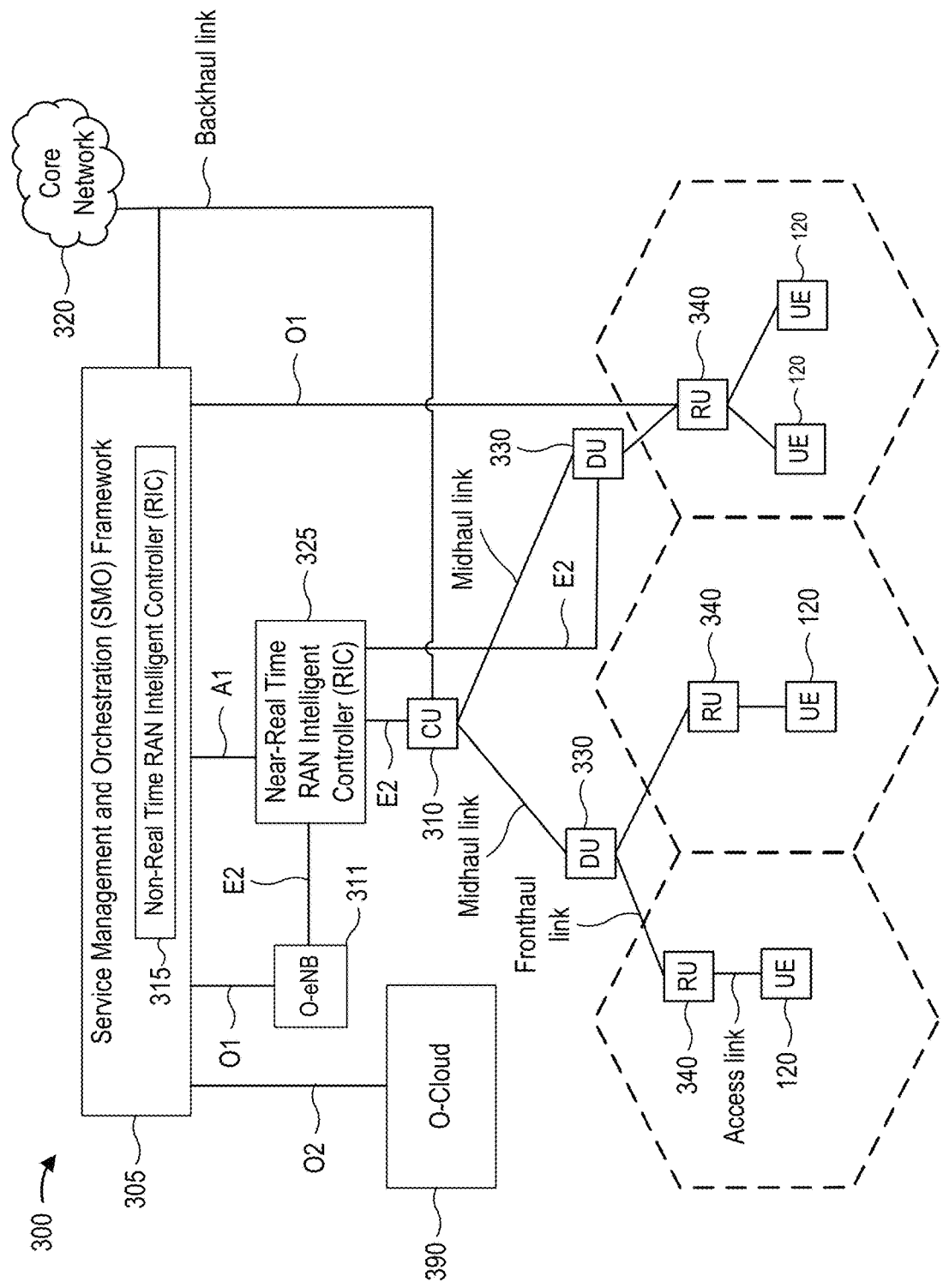
FIG. 3 is a block diagram illustrating an example disaggregated base station architecture, in accordance with various aspects of the present disclosure.

The core network 130 or the base stations 110 or any other network device (e.g., as seen in FIG. 3) may include a DCI encoding module 138. For brevity, only one base station 110a is shown as including the DCI encoding module 138. The DCI encoding module 138 may configure a BWP. The DCI encoding module 138 may also transmit an FDRA in a slot. The FDRA includes a first type of bits corresponding to a downlink allocation, the downlink allocation falling within the downlink BWP, and a second type of bits corresponding to either a known sequence or repeated bits. The DCI encoding module 138 may further communicate in accordance with the FDRA.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
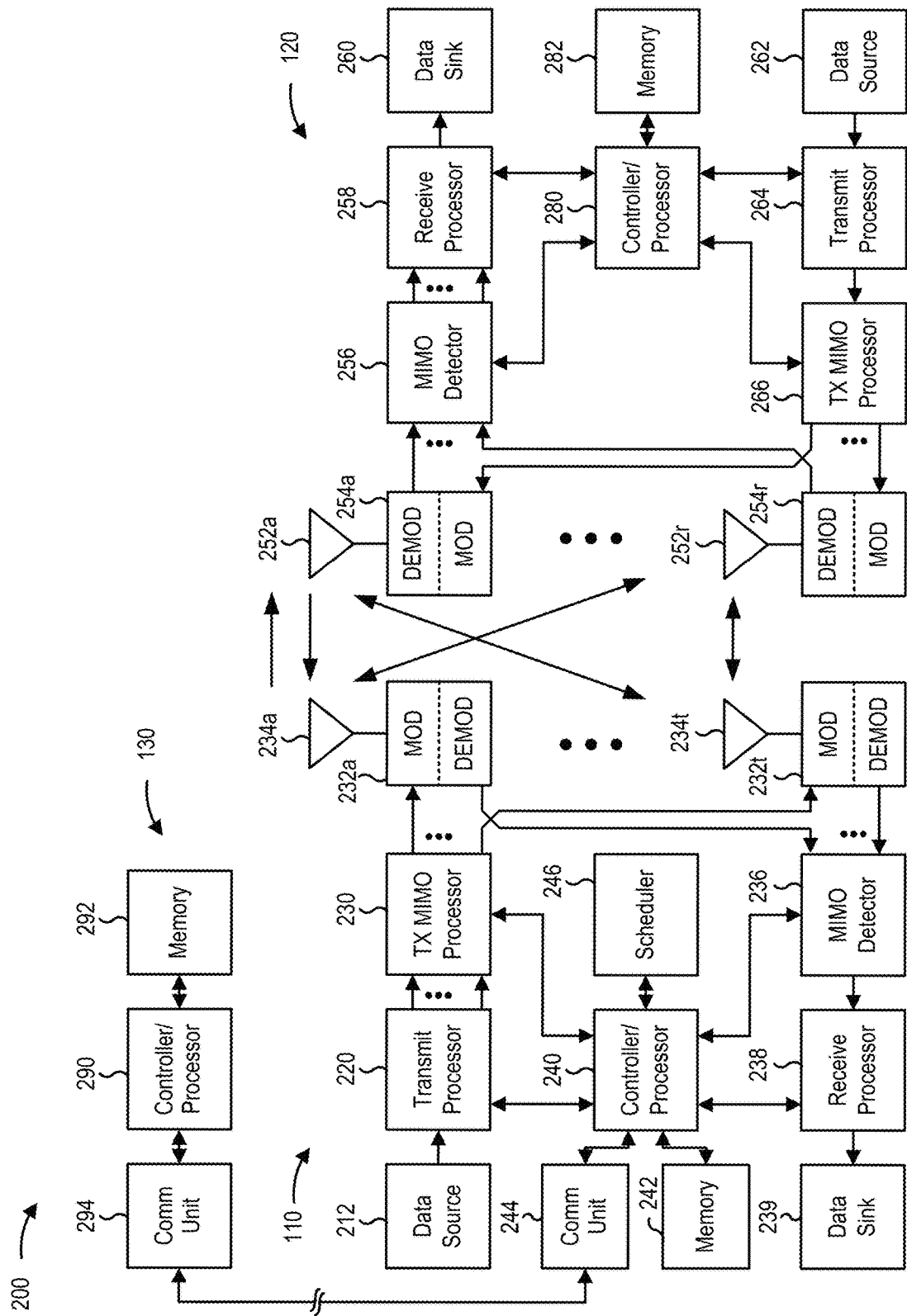
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with encoding and decoding of scheduling DCI, as described in more detail elsewhere. For example, the controller/processor 240 of the base station 110, the controller/processor 280 of the UE 120, and/or any other component(s) of FIG. 2 may perform or direct operations of, for example, the processes of FIGS. 14 and 15 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for communicating, means for configuring, and means for transmitting. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

Full-duplex communication is simultaneous bi-directional communication. For example, a UE may transmit uplink data at the same time the UE receives downlink data. There are two types of full-duplex operation: in-band full-duplex and sub-band full-duplex.

Figure 4:
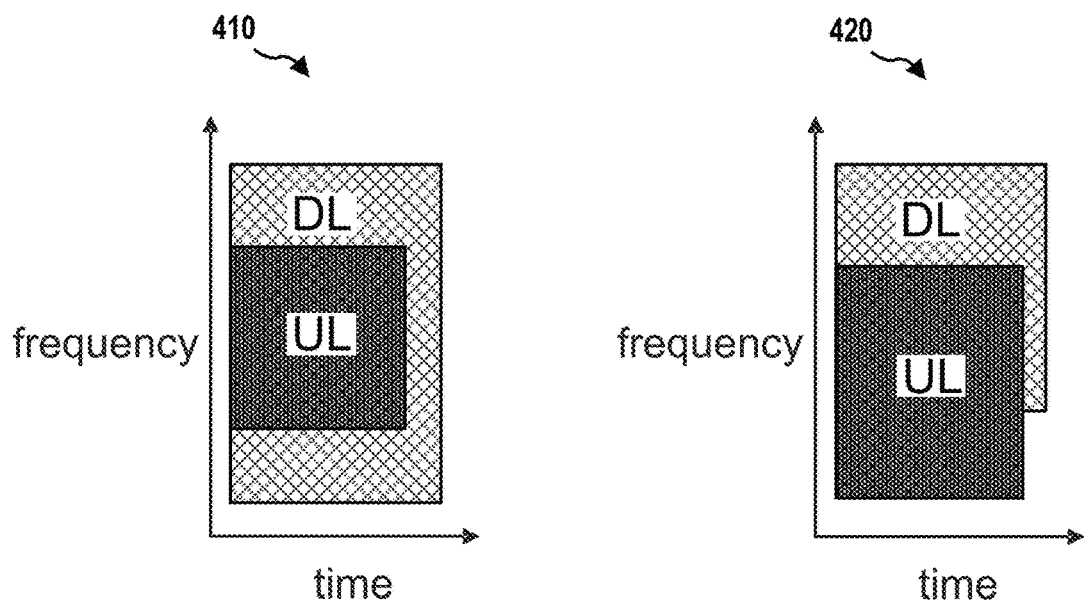
FIG. 4 illustrates in-band full-duplex operation where a device transmits and receives at the same time on the same frequency resources, in accordance with various aspects of the present disclosure.

FIG. 4 illustrates in-band full-duplex operation where a device transmits and receives at the same time on the same frequency resources, in accordance with various aspects of the present disclosure. The downlink and uplink transmissions share the same in-band full-duplex time and frequency resources. In a first scenario 410, the uplink (UL) and downlink (DL) resources fully overlap. In a second scenario 420, the uplink and downlink resources partially overlap.

Figure 5:
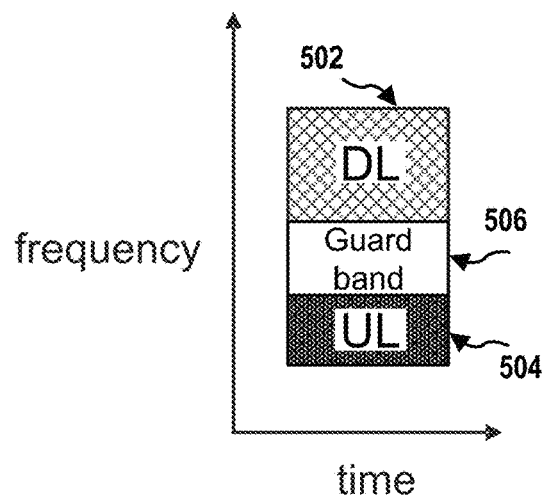
FIG. 5 illustrates sub-band frequency division duplexing (FDD) operation where a device transmits and receives at the same time on different frequency resources, in accordance with various aspects of the present disclosure.

FIG. 5 illustrates sub-band frequency division duplexing (FDD) (also referred to as flexible duplex or sub-band full-duplex (SBFD)) operation where a device transmits and receives at the same time on different frequency resources, in accordance with various aspects of the present disclosure. In the example of FIG. 5, downlink resources 502 are separated from uplink resources 504 in the frequency domain by a guard band 506. Thus, SBFD slots contain resources for both downlink and uplink communications, as well as potentially a guard band between the downlink and uplink resources. The SBFD slots enable simultaneous transmission and reception by a device.

Figure 6:
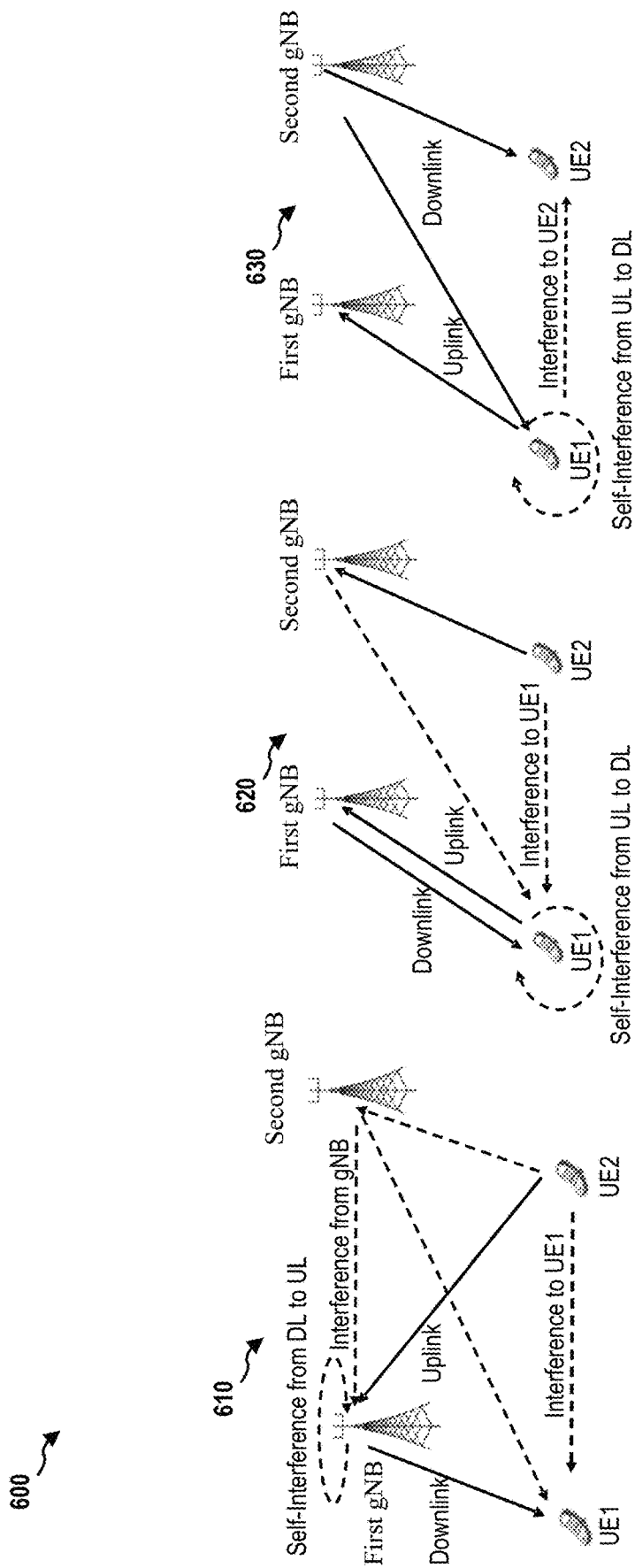
FIG. 6 is a diagram illustrating full-duplex communication modes, in accordance with various aspects of the present disclosure.

FIG. 6 is a diagram 600 illustrating full-duplex communication modes, in accordance with various aspects of the present disclosure. For example, a first scenario 610 depicts full-duplex base stations communicating with half-duplex, UEs (shown as UE1 and UE2) in non-overlapping uplink and downlink sub-bands (e.g., as seen in FIG. 5). In the first scenario 610, a full-duplex first gNB may transmit on the downlink channel to UE1 and receive on the uplink channel from UE2. However, UE2 may cause interference on UE1 due to the uplink transmissions to the first gNB. Further, the second gNB may cause interference on the first gNB due to downlink communications with both UE1 and UE2. Additionally, the first gNB may experience self-interference from the downlink and uplink communications.

In a second scenario 620, a full-duplex gNB and a full-duplex UE1 communicate with partially or fully overlapping uplink and downlink sub-bands (e.g., as seen in FIG. 4). In the second scenario 620, UE1 experiences self-interference from the full-duplex uplink and downlink communications with the first gNB, and also receives interference from UE2, which transmits uplink communications to the second gNB. UE1 also receives interference from downlink communications of the second gNB.

In a third scenario 630, a full-duplex UE1 communicates with multiple transmit and receive points (m-TRPs). The full-duplex UE1 communicates simultaneously in the uplink with a first gNB of the m-TRPs and in the downlink with a second gNB of the m-TRPs. UE1 is configured in full-duplex mode, and thus, UE1 experiences self-interference due to uplink and downlink communications with both the first gNB and second gNB. Interference to UE2 is also received from UE1 as result of the uplink communications from UE1. As shown in the third scenario 630, UE2 receives downlink communications from the second gNB.

Although the preceding examples are described with respect to gNBs, it is noted that any network node is contemplated, including the components described with respect to FIG. 3.

A slot format for full-duplex communications may be defined as a downlink plus uplink 'D+U'. In the 'D+U' slot a band is used for both UL and DL transmissions. The DL and UL transmissions can occur in overlapping bands (e.g., in-band full-duplex) or adjacent bands (e.g., sub-band full-duplex). In a given 'D+U' symbol, a half-duplex UE either transmits in the UL band or receives in the DL band. In a given 'D+U' symbol, a full-duplex UE can transmit in the UL band and/or receive in the DL band in the same symbol. A 'D+U' slot can contain DL-only symbols, UL-only symbols or full-duplex symbols.

Figure 7:
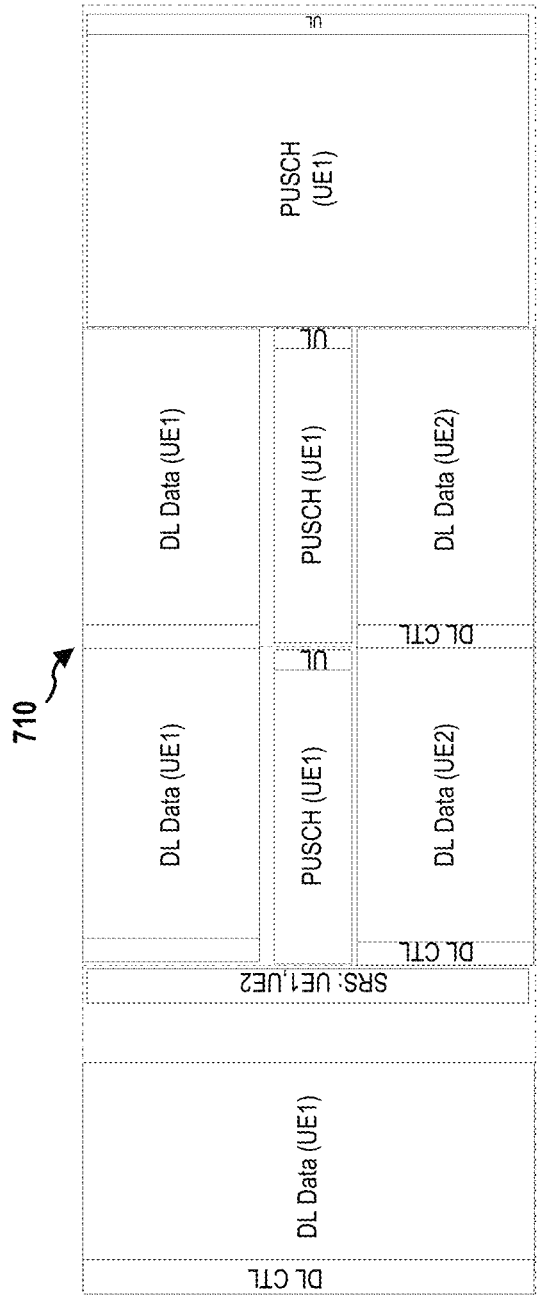
FIG. 7 is a diagram illustrating a sub-band full-duplex (SBFD) slot, in accordance with various aspects of the present disclosure.

FIG. 7 is a diagram illustrating a sub-band full-duplex (SBFD) slot 710, in accordance with various aspects of the present disclosure. The diagram depicts a subframe/slot breakdown for communications between a full-duplex TRP, a full-duplex UE (UE1) and a half-duplex UE (UE2). In this example, the entities may engage in flexible downlink and uplink operations in time across slots and across UEs. That is, a simultaneous physical downlink shared channel (PDSCH) and physical uplink shared channel (PUSCH) grant for the same subframe/slot for different UEs may be configured. The full-duplex UEs may be configured for an uplink and downlink grant. The UEs may change the uplink transmission and/or the downlink reception bandwidth portion between slots with zero latency. The UEs may transmit a sounding reference signal (SRS) with full reciprocity (e.g., full-duplex) to cover the whole downlink bandwidth portion and partial reciprocity (e.g., half-duplex) to cover part of the downlink bandwidth. Downlink control (DL CTL) information may be transmitted across all frequency resources or across partial frequency resources. In this example, the dotted lines of the slot 710 depict the subframe/slot breakdown of the full-duplex TRP and the half-duplex UE.

A frequency domain resource allocation (FDRA) allocates resource blocks (e.g., frequency sub-bands) for each transmission and reception. Two types of allocations include a Type 0 allocation and a Type 1 allocation. A Type 0 allocation is a disjoint resource block (RB) allocation specified by a bitmap. The allocation is in multiple resource block groups (RBGs). An RBG size depends on a bandwidth part (BWP) size and a configuration type. A size of the bitmap is either nine or eighteen bits. In a Type 1 allocation, consecutive RBs are allocated, determined by an RB_start value, and a number of consecutive RBs that are combined in a resource indicator value (RIV) field.

Due to varying frequency allocations, only a portion of a configured bandwidth part (BWP) may overlap with an allocated sub-band. For example, an allocated downlink sub-band may be located in a lower half of a frequency band while the configured downlink BWP spans the entire frequency band.

The FDRA is carried in downlink control information (DCI) and may include a bitmap or a resource indicator value (RIV). The bitmap or RIV may contain redundant bits if the BWP spans a larger bandwidth than the allocated (or useful) bandwidth. The bitmap and RIV indications are designed for the configured BWP, and not only the useful bandwidth.

Figure 8:
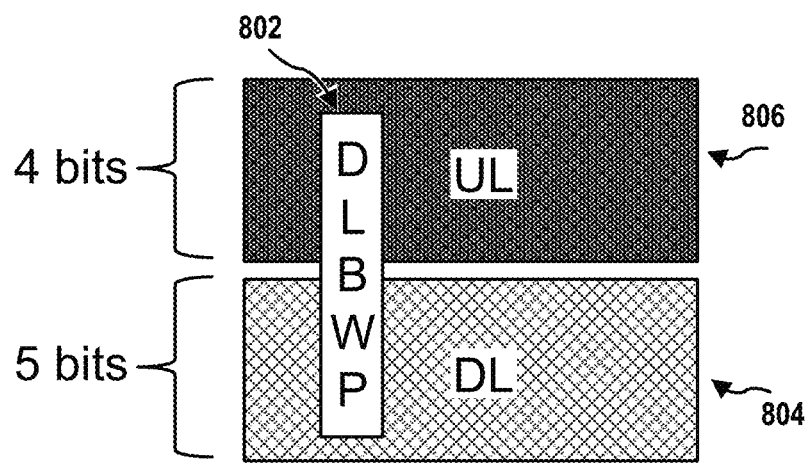
FIG. 8 is a block diagram illustrating a frequency domain resource allocation (FDRA) overlapping with a configured downlink (DL) bandwidth part (BWP), in accordance with various aspects of the present disclosure.

FIG. 8 is a block diagram illustrating a frequency domain resource allocation (FDRA) overlapping with a configured downlink (DL) bandwidth part (BWP), in accordance with aspects of the present disclosure. Bits of the FDRA that fall outside of the configured BWP in a conflicting transmission direction are referred to as 'useless' bits. For example, FIG. 8 shows a downlink (DL) BWP 802. Moreover, FIG. 8 shows an FDRA that include nine bits: five bits for a downlink allocation 804, and four bits for an uplink allocation 806. The five bits for the downlink allocation 804 coincide with the configured downlink BWP. However, the four bits for the uplink allocation 806 conflict with the downlink BWP. Because the bandwidth (e.g., DL BWP 802) is configured for downlink communications, the four conflicting uplink allocation bits are referred to as 'useless' bits.

According to aspects of the present disclosure, the redundant bits, if fixed and known to the user equipment (UE), can help the UE decode the DCI faster and with higher reliability. That is, the UE can replace the log likelihood ratios (LLRs) of the corresponding useless bits to infinity and negative infinity. For example, the base station may transmit a fixed sequence in these bits that is either all zeros or any other sequence that is radio resource control (RRC) configured to the UE. Thus, the UE can easily decode the known information.

The redundant bits may also be used to repeat certain fields in the DCI and hence, improve the decodability. For example, if a number of useful bits is equal to a number of useless bits, all useful bits may be repeated. If a number of useful bits is larger than a number of useless bits, some of the useful bits may be repeated. If a number of useful bits is smaller than a number of useless bits, some of the useful bits may be repeated more than once. In some aspects, repetition may occur starting from a first bit of the bitmap, a second bit of the bitmap, or according to an RRC configured sequence. Because the UE is expecting a specific number of bits, all bits are transmitted to the UE.

Figure 9:
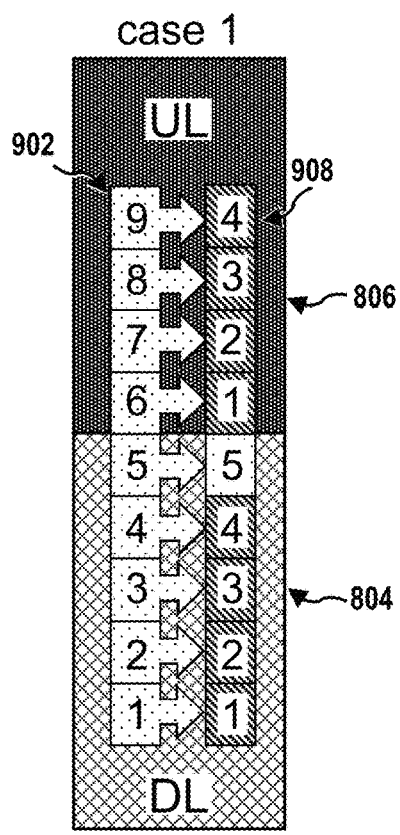
FIG. 9 is a block diagram illustrating repeating useful FDRA bitmap bits, in accordance with various aspects of the present disclosure.

FIG. 9 is a block diagram illustrating repeating useful FDRA bitmap bits, in accordance with various aspects of the present disclosure. In the example of FIG. 9, a downlink BWP range 902 is illustrated with nine bits. Bits 1-5 correspond to a downlink allocation 804. Bits 6-9 correspond to an uplink allocation 806. In this example, the useful bits are bits 1-5 and the useless bits are bits 6-9. According to aspects of the present disclosure, a portion of the bits are repeated in the useless locations. In the example of FIG. 9, bits 1-4 are repeated in the bit locations corresponding to the uplink allocation 806. More specifically, bits 1-5 are initially transmitted in their original locations, which correspond to the downlink allocation 804. Bits 1-4 are also repeated in the original locations of bits 6-9, which correspond to the uplink allocation 806. A column 908 indicates what is actually transmitted.

In some examples the BWP spans more than one disjoint band. In such examples, the repeated bits may be bits in a lower sub-band, an upper sub-band, or a combination that may be RRC configured. In some aspects, the useless bits may be used to transmit repetition of other fields in the DCI, such as a time domain resource allocation (TDRA).

Figure 10:
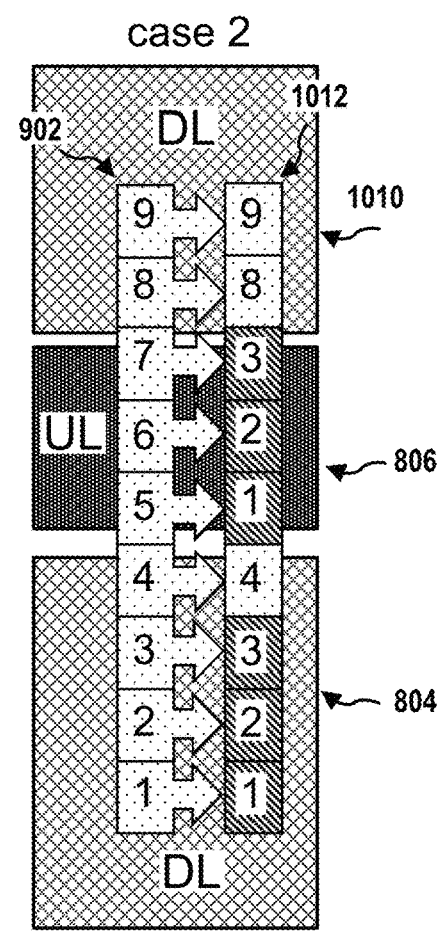
FIG. 10 is a block diagram illustrating repeating useful FDRA bitmap bits when a bandwidth part (BWP) spans multiple disjoint bands, in accordance with various aspects of the present disclosure.

FIG. 10 is a block diagram illustrating repeating useful FDRA bitmap bits when a bandwidth part (BWP) spans multiple disjoint bands, in accordance with various aspects of the present disclosure. In the example of FIG. 10, the BWP 902 spans a first downlink allocation 804, an uplink allocation 806, and a second downlink allocation 1010. A column 1012 shows what is actually transmitted. In this example, the first three bits 1-3 are repeated in the bit locations corresponding to the uplink allocation 806, that is, the locations of the original bits 5-7. The first four bits 1-4 and the last two bits 8 and 9 are transmitted in their original bit locations. Thus, in this example, the repeated bits are the bits in the lower sub-band.

Aspects of the present disclosure also address Type 1 FDRA allocations. In these aspects, the RIV indication is complex because it is not clear which bits will be useful and which bits will not be useful. For example, assume the length of the BWP is five resource blocks, the RIV indication required is $\log_2(5\times 6/2)=4$ bits. Possible allocations are shown in FIG. 11.

Figure 11:
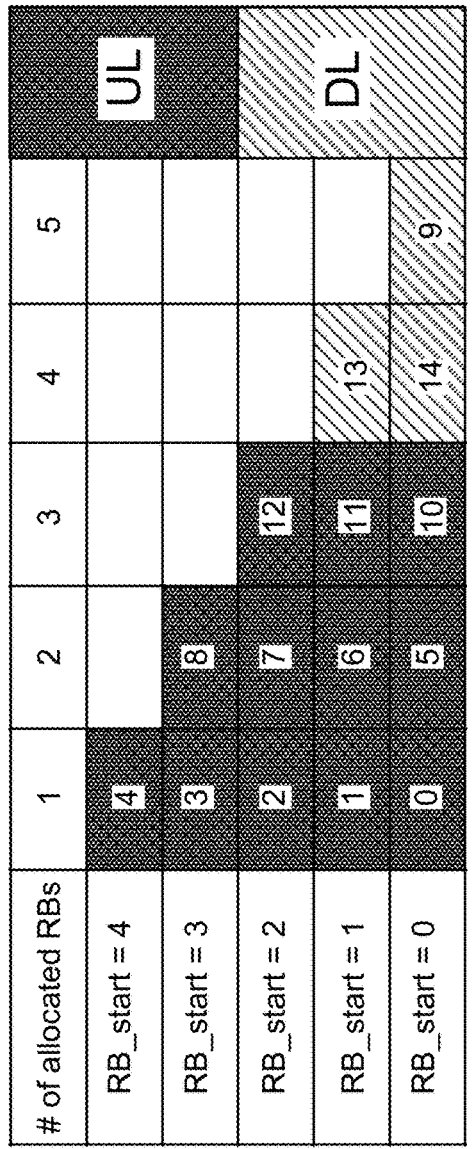
FIG. 11 is a table illustrating a number of allocated resource blocks (RBs) and an RB start location, in accordance with various aspects of the present disclosure.

FIG. 11 is a table illustrating a number of allocated resource blocks (RBs) and an RB start location, in accordance with various aspects of the present disclosure. In the example of FIG. 11, each row corresponds to an RB start location. Each column corresponds to a number of allocated RBs. The table gives the RIV value corresponding to every possible RB start value in each row and every possible number of allocated RBs in each column. For example, the value in the last row with the column labeled # of allocated RBs=2 (third column from left), the RIV value is 5. The RIV value of 5 corresponds to the RB_start value of zero and two allocated RBs. If the number of allocated RBs is two, the RB can start at resource 0, 1, 2, or 3, but not 4. In another example, if a number of allocated RBs is only one, the RB can start at resource 0, 1, 2, 3, or 4.

Figure 12:
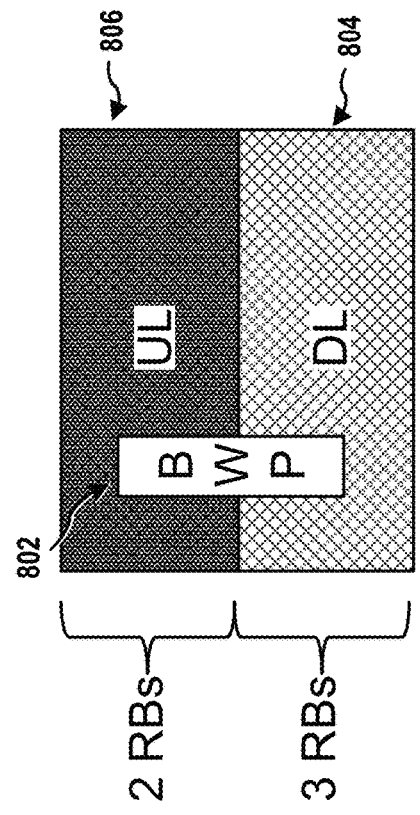
FIG. 12 is a block diagram illustrating a Type 1 frequency domain resource allocation (FDRA) overlapping with a configured downlink (DL) bandwidth part (BWP), in accordance with aspects of the present disclosure.

FIG. 12 is a block diagram illustrating a Type 1 frequency domain resource allocation (FDRA) overlapping with a configured downlink (DL) bandwidth part (BWP) 802, in accordance with aspects of the present disclosure. In the example of FIG. 12, the DL BWP 802 overlaps with the DL allocation 804 in only three RBs. Thus, the valid RIV values are 0, 1, 2, 5, 6, and 10, which if converted to the binary RIV indication give 0000, 0001, 0010, 0101, 0110, and 1010. This binary representation shows that not one bit can be considered as fixed or useless.

According to aspects of the present disclosure, the UE may use its knowledge of the possible RIV values in the decoding of unknown DCI values. In the example shown in FIG. 12, when the UE decodes the RIV field and decodes the most significant bit as 1, the UE may safely assume that the rest of the bit field is 010. This technique may also be applied to half-duplex slots.

Figure 13:
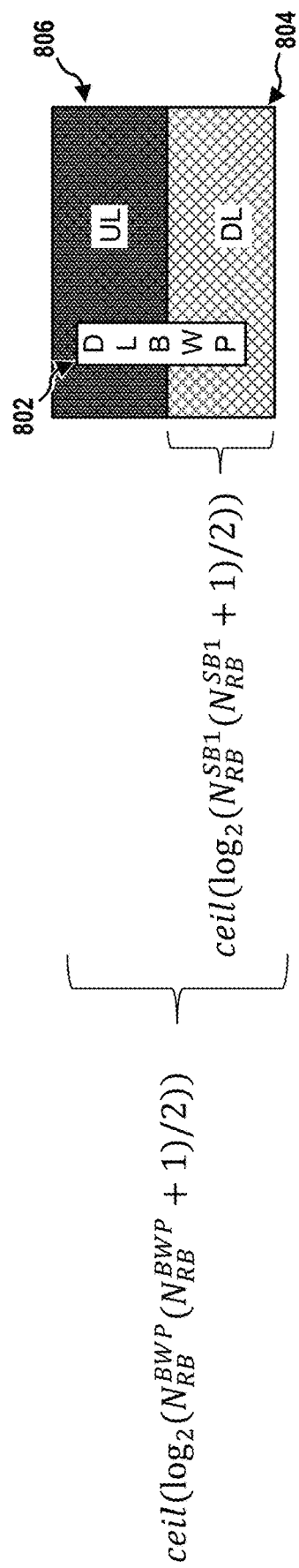
FIG. 13 is a block diagram illustrating a Type 1 frequency domain resource allocation (FDRA) overlapping with a configured downlink (DL) bandwidth part (BWP), in accordance with aspects of the present disclosure.

FIG. 13 is a block diagram illustrating a Type 1 frequency domain resource allocation (FDRA) overlapping with a configured downlink (DL) bandwidth part (BWP) 802, in accordance with aspects of the present disclosure. In the example of FIG. 13, the base station transmits ceil($\log_2$ ($N_{RB}^{BWP}(N_{RB}^{BWP}+1)/2$)) bits in the RIV field with ceil($\log_2$ ($N_{RB}^{SB1}(N_{RB}^{SB1}+1)/2$)) bits from them being useful bits, where $N_{RB}^{BWP}$ represents the number of resource blocks (RBs) in the bandwidth part, and $N_{RB}^{SB1}$ represents the number of RBs in the sub-band. According to aspects of the present disclosure, the remaining useless bits are fixed and known to the UE. In other aspects, the first ceil($\log_2(N_{RB}^{SB1}$ ($N_{RB}^{SB1}+1)/2$)) bits of the remaining bits are partially or fully repeated.

Figure 14:
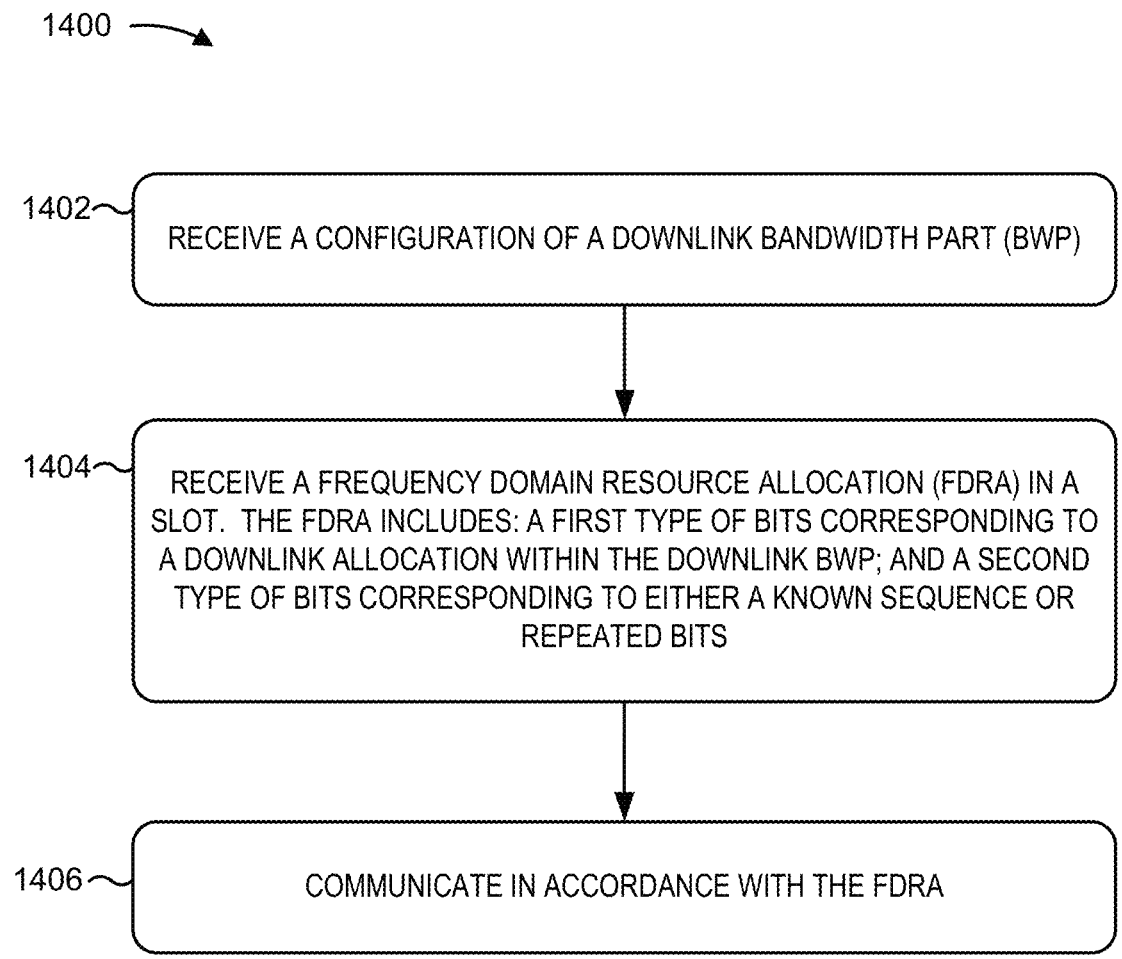
FIG. 14 is a flow diagram illustrating an example process performed, for example, by a user equipment (UE), in accordance with various aspects of the present disclosure.

FIG. 14 is a flow diagram illustrating an example process 1400 performed, for example, by a user equipment (UE), in accordance with various aspects of the present disclosure. The example process 1400 is an example of enhancing decodability when scheduling downlink control information (DCI) in sub-band full-duplex (SBFD) slots. The operations of the process 1400 may be implemented by a UE 120.

At block 1402, the user equipment (UE) receives a configuration of a downlink bandwidth part (BWP). For example, the UE (e.g., using the antenna 252, DEMOD/MOD 254, MIMO detector 256, receive processor 258, controller/processor 280, memory 282, and/or the like) may receive the configuration. In some aspects, the downlink BWP is non-contiguous, and the method further comprises receiving a configuration indicating a non-contiguous band that includes a repeated allocation when the second type of bits are the repeated bits.

At block 1404, the user equipment (UE) receives a frequency domain resource allocation (FDRA) in a slot. The FDRA includes a first type of bits corresponding to a downlink allocation within the downlink BWP and a second type of bits corresponding to either a known sequence or repeated bits. For example, the UE (e.g., using the antenna 252, DEMOD/MOD 254, MIMO detector 256, receive processor 258, controller/processor 280, memory 282, and/or the like) may receive the FDRA. In some aspects, the known sequence comprises zeroes or a sequence configured to the UE. In some aspects, the repeated bits are repeated time domain resource allocation (TDRA) bits. In other aspects, the repeated bits are bitmap bits of a Type 0 FDRA, the slot is a sub-band full-duplex (SBFD) slot. In still other aspects, the repeated bits are bits based on a resource indicator value (RIV) indication from a Type 1 FDRA, the slot is a sub-band full-duplex (SBFD) slot. In further aspects, the repeated bits are bits based on a resource indicator value (RIV) indication from a Type 1 FDRA, and the slot is a half-duplex slot.

At block 1406, the user equipment (UE) communicates in accordance with the FDRA. For example, the UE (e.g., using the antenna 252, DEMOD/MOD 254, MIMO detector 256, receive processor 258, TX MIMO processor 266, transmit processor 264, controller/processor 280, memory 282, and/or the like) may communicate in accordance with the FDRA. In some aspects, the communicating comprises receiving the repeated bits from a repeated allocation. In these aspects, the repeated allocation is all of the downlink allocation when a quantity of the first type of bits is the same as a quantity of the second type of bits. In other aspects, the communicating comprises receiving the repeated bits from a repeated allocation. In these aspects, the repeated allocation is a portion of the downlink allocation when a quantity of the first type of bits is larger than a quantity of the second type of bits. In still other aspects, the communicating comprises receiving the repeated bits from a repeated allocation. In these aspects, the repeated allocation is multiple repetitions of the downlink allocation when a quantity of the first type of bits is less than a quantity of the second type of bits.

Figure 15:
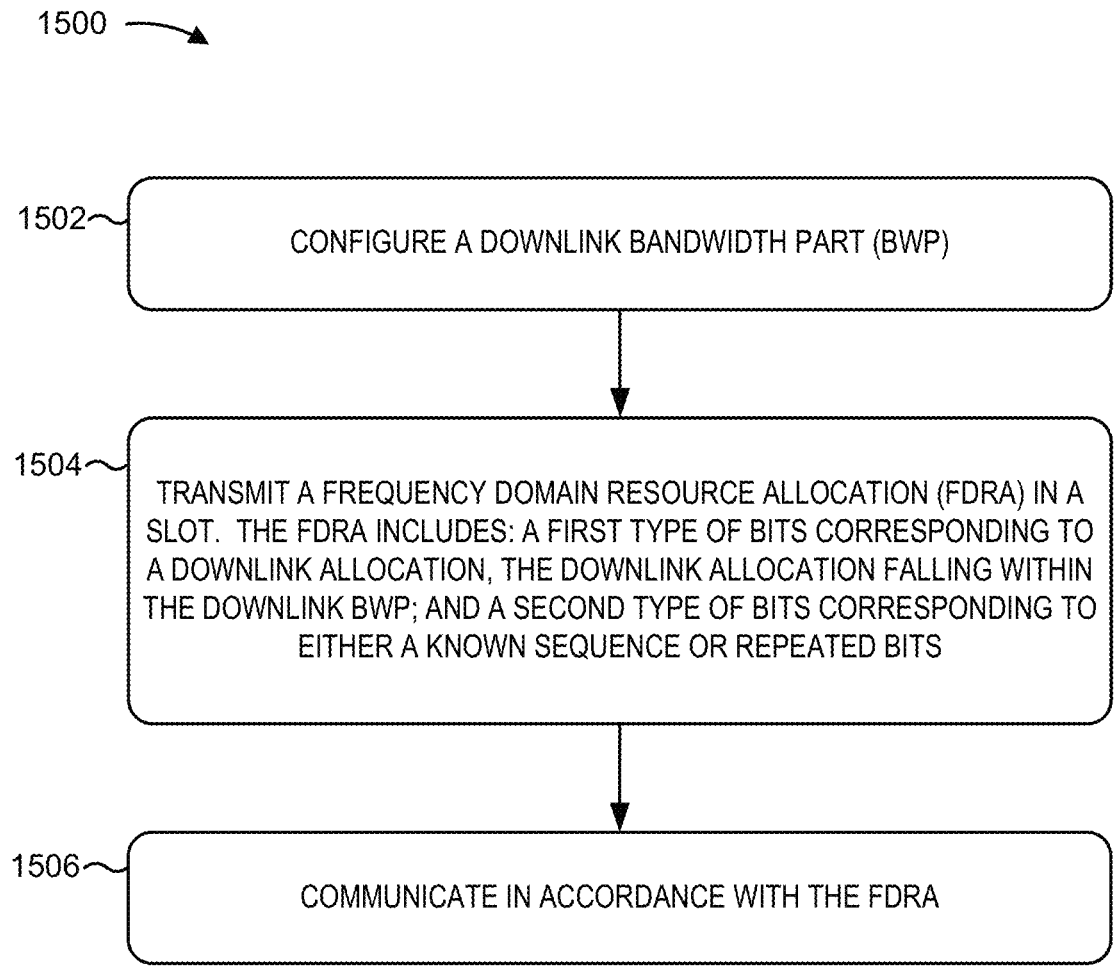
FIG. 15 is a flow diagram illustrating an example process performed, for example, by a network device, in accordance with various aspects of the present disclosure.

FIG. 15 is a flow diagram illustrating an example process 1500 performed, for example, by a network device, in accordance with various aspects of the present disclosure. The example process 1500 is an example of enhancing decodability when scheduling downlink control information (DCI) in sub-band full-duplex (SBFD) slots. The operations of the process 1500 may be implemented by a network device, such as base station 110.

At block 1502, the base station 110 configures a BWP. For example, the base station (e.g., using the antenna 234, MOD/DEMOD 232, TX MIMO processor 230, transmit processor 220, the controller/processor 280, memory 282, and/or the like) may configure the BWP. In some aspects, the downlink BWP is non-contiguous, and the method further comprises receiving a configuration indicating a non-contiguous band that includes a repeated allocation when the second type of bits are the repeated bits.

At block 1504, the base station 110 transmits an FDRA in a slot. The FDRA includes first type of bits corresponding to a downlink allocation, the downlink allocation falling within the downlink BWP and a second type of bits corresponding to either a known sequence or repeated bits. For example, the base station (e.g., using the antenna 234, MOD/DEMOD 232, TX MIMO processor 230, transmit processor 220, controller/processor 240, memory 242, and/or the like) may transmit the FDRA. In some aspects, the known sequence comprises zeroes or a sequence configured to the UE. In some aspects, the repeated bits are repeated time domain resource allocation (TDRA) bits. In other aspects, the repeated bits are bitmap bits of a Type 0 FDRA, the slot is a sub-band full-duplex (SBFD) slot. In still other aspects, the repeated bits are bits based on a resource indicator value (RIV) indication from a Type 1 FDRA, the slot is a sub-band full-duplex (SBFD) slot. In further aspects, the repeated bits are bits based on a resource indicator value (RIV) indication from a Type 1 FDRA, and the slot is a half-duplex slot.

At block 1506, the base station 110 communicates in accordance with the FDRA. The FDRA includes first type of bits corresponding to a downlink allocation, the downlink allocation falling within the downlink BWP and a second type of bits corresponding to either a known sequence or repeated bits. For example, the base station (e.g., using the antenna 234, MOD/DEMOD 232, MIMO detector 236, receive processor 238, TX MIMO processor 230, transmit processor 220, controller/processor 240, memory 242, and/or the like) may communicate in accordance with the FDRA. In some aspects, the communicating comprises transmitting the repeated bits from a repeated allocation. In these aspects, the repeated allocation is all of the downlink allocation when a quantity of the first type of bits is the same as a quantity of the second type of bits. In other aspects, the communicating comprises transmitting the repeated bits from a repeated allocation. In these aspects, the repeated allocation is a portion of the downlink allocation when a quantity of the first type of bits is larger than a quantity of the second type of bits. In still other aspects, the communicating comprises transmitting the repeated bits from a repeated allocation. In these aspects, the repeated allocation is multiple repetitions of the downlink allocation when a quantity of the first type of bits is less than a quantity of the second type of bits.

Example Aspects

Aspect 1: A method of wireless communication by a user equipment (UE), comprising: receiving a configuration of a downlink bandwidth part (BWP); receiving a frequency domain resource allocation (FDRA) in a slot, the FDRA including: a first type of bits corresponding to a downlink allocation within the downlink BWP; and a second type of bits corresponding to either a known sequence or repeated bits; and communicating in accordance with the FDRA.

Aspect 2: The method of Aspect 1, in which the known sequence comprises zeroes or a sequence configured to the UE.

Aspect 3: The method of Aspect 1, in which the communicating comprises receiving the repeated bits from a repeated allocation, the repeated allocation comprising all of the downlink allocation when a quantity of the first type of bits is the same as a quantity of the second type of bits.

Aspect 4: The method of Aspect 1, in which the communicating comprises receiving the repeated bits from a repeated allocation, the repeated allocation comprising a portion of the downlink allocation when a quantity of the first type of bits is larger than a quantity of the second type of bits.

Aspect 5: The method of Aspect 1, in which the communicating comprises receiving the repeated bits from a repeated allocation, the repeated allocation comprising multiple repetitions of the downlink allocation when a quantity of the first type of bits is less than a quantity of the second type of bits.

Aspect 6: The method of any of Aspects 3-5, further comprising receiving a configuration for a sequence of a repeated allocation when the second type of bits are the repeated bits.

Aspect 7: The method of any of Aspects 3-5, in which the downlink BWP is non-contiguous, and the method further comprises receiving a configuration indicating a non-contiguous band that includes a repeated allocation when the he second type of bits are the repeated bits.

Aspect 8: The method of any Aspects 3-7, in which the repeated bits comprise repeated time domain resource allocation (TDRA) bits.

Aspect 9: The method of any of the Aspects 3-7, in which: the repeated bits comprise bitmap bits of a Type 0 FDRA; and the slot comprises a sub-band full-duplex (SBFD) slot.

Aspect 10: The method of any of the Aspects 3-7, in which: the repeated bits comprise bits based on a resource indicator value (RIV) indication from a Type 1 FDRA; and the slot comprises a sub-band full-duplex (SBFD) slot.

Aspect 11: The method of any of the Aspects 3-7, in which: the repeated bits comprise bits based on a resource indicator value (RIV) indication from a Type 1 FDRA; and the slot comprises a half-duplex slot.

Aspect 12: A method of wireless communication by a network device, comprising: configuring a downlink bandwidth part (BWP); transmitting a frequency domain resource allocation (FDRA) in a slot, the FDRA including: a first type of bits corresponding to a downlink allocation, the downlink allocation falling within the downlink BWP; and a second type of bits corresponding to either a known sequence or repeated bits; and communicating in accordance with the FDRA.

Aspect 13: The method of Aspect 12, in which the known sequence comprises zeroes or a sequence configured to a user equipment (UE).

Aspect 14: The method of Aspect 12, in which the communicating comprises transmitting the repeated bits from a repeated allocation, the repeated allocation comprising all of the downlink allocation when a quantity of the first type of bits is the same as a quantity of the second type of bits.

Aspect 15: The method of Aspect 12, in which the communicating comprises transmitting the repeated bits from a repeated allocation, the repeated allocation comprising a portion of the downlink allocation when a quantity of the first type of bits is larger than a quantity of the second type of bits.

Aspect 16: The method of Aspect 12, in which the communicating comprises transmitting the repeated bits from a repeated allocation, the repeated allocation comprising multiple repetitions of the downlink allocation when a quantity of the first type of bits is less than a quantity of the second type of bits.

Aspect 17: The method of any of the Aspects 14-16, further comprising transmitting a configuration for a sequence of a repeated allocation when the second type of bits are the repeated bits.

Aspect 18: The method of any of the Aspects 14-16, in which the downlink BWP is non-contiguous, and the method further comprises transmitting a configuration indicating non-contiguous band that includes a repeated allocation when the second type of bits are the repeated bits.

Aspect 19: The method of any of the Aspects 14-18, in which the repeated bits comprise repeated time domain resource allocation (TDRA) bits.

Aspect 20: The method of any of the Aspects 14-18, in which: the repeated bits comprise bitmap bits of a Type 0 FDRA; and the slot comprises a sub-band full-duplex (SBFD) slot.

Aspect 21: The method of any of the Aspects 14-18, in which: the repeated bits comprise bits based on a resource indicator value (RIV) indication from a Type 1 FDRA; and the slot comprises a sub-band full-duplex (SBFD) slot.

Aspect 22: The method of any of the Aspects 14-18, in which: repeated bits comprise bits based on a resource indicator value (RIV) indication from a Type 1 FDRA; and the slot comprises a half-duplex slot.

Aspect 23: An apparatus for wireless communication by a user equipment (UE), comprising: a memory; and at least one processor coupled to the memory, the at least one processor configured: to receive a configuration of a downlink bandwidth part (BWP); to receive a frequency domain resource allocation (FDRA) in a slot, the FDRA including: a first type of bits corresponding to a downlink allocation within the downlink BWP; and a second type of bits corresponding to either a known sequence or repeated bits; and to communicate in accordance with the FDRA.

Aspect 24: The apparatus of Aspect 23, in which the known sequence comprises zeroes or a sequence configured to the UE.

Aspect 25: The apparatus of Aspect 23, in which the processor communicates by receiving the repeated bits from a repeated allocation, the repeated allocation comprising all of the downlink allocation when a quantity of the first type of bits is the same as a quantity of the second type of bits.

Aspect 26: The apparatus of Aspect 23, in which the processor communicates by receiving the repeated bits from a repeated allocation, the repeated allocation comprising a portion of the downlink allocation when a quantity of the first type of bits is larger than a quantity of the second type of bits.

Aspect 27: The apparatus of Aspect 23, in which the processor communicates by receiving the repeated bits from a repeated allocation, the repeated allocation comprising multiple repetitions of the downlink allocation when a quantity of the first type of bits is less than a quantity of the second type of bits.

Aspect 28: The apparatus of any of the Aspects 24-27, in which the at least one processor is further configured to receive a configuration for a sequence of a repeated allocation when the second type of bits are the repeated bits.

Aspect 29: The apparatus of any of the Aspects 23-27, in which the downlink BWP is non-contiguous, and the method further comprises receiving a configuration indicating a non-contiguous band that includes a repeated allocation when the he second type of bits are the repeated bits.

Aspect 30: The apparatus of any of the Aspects 23-29, in which the repeated bits comprise repeated time domain resource allocation (TDRA) bits.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving a configuration of a downlink bandwidth part (BWP) of a sub-band full duplex (SBFD) slot;
   receiving a frequency domain resource allocation (FDRA) in the sub-band full duplex (SBFD) slot, the FDRA including: a first type of bits corresponding to a downlink allocation within the downlink BWP; and a second type of bits corresponding to either a known sequence or repeated bits; and
   communicating in the sub-band full duplex (SBFD) slot in accordance with the FDRA.

2. The method of claim 1, in which the known sequence comprises zeroes or a sequence configured to the UE.

3. The method of claim 1, in which the communicating comprises receiving the repeated bits from a repeated allocation, the repeated allocation comprising all of the downlink allocation when a quantity of the first type of bits is the same as a quantity of the second type of bits.

4. The method of claim 1, in which the communicating comprises receiving the repeated bits from a repeated allocation, the repeated allocation comprising a portion of the downlink allocation when a quantity of the first type of bits is larger than a quantity of the second type of bits.

5. The method of claim 1, in which the communicating comprises receiving the repeated bits from a repeated allocation, the repeated allocation comprising multiple repetitions of the downlink allocation when a quantity of the first type of bits is less than a quantity of the second type of bits.

6. The method of claim 1, further comprising receiving a configuration for a sequence of a repeated allocation when the second type of bits are the repeated bits.

7. The method of claim 1, in which the downlink BWP is non-contiguous, and the method further comprises receiving a configuration indicating a non-contiguous band that includes a repeated allocation when the second type of bits are the repeated bits.

8. The method of claim 1, in which the repeated bits comprise repeated time domain resource allocation (TDRA) bits.

9. The method of claim 1, in which:
   the repeated bits comprise bitmap bits of a Type 0 FDRA.

10. The method of claim 1, in which:
    the repeated bits comprise bits based on a resource indicator value (RIV) indication from a Type 1 FDRA.

11. A method of wireless communication by a network device, comprising:
    configuring a downlink bandwidth part (BWP) of a sub-band full duplex (SBFD) slot;
    transmitting a frequency domain resource allocation (FDRA) in the sub-band full duplex (SBFD) slot, the FDRA including: a first type of bits corresponding to a downlink allocation, the downlink allocation falling within the downlink BWP; and a second type of bits corresponding to either a known sequence or repeated bits; and
    communicating in the sub-band full duplex (SBFD) slot in accordance with the FDRA.

12. The method of claim 11, in which the known sequence comprises zeroes or a sequence configured to a user equipment (UE).

13. The method of claim 11, in which the communicating comprises transmitting the repeated bits from a repeated allocation, the repeated allocation comprising all of the downlink allocation when a quantity of the first type of bits is the same as a quantity of the second type of bits.

14. The method of claim 11, in which the communicating comprises transmitting the repeated bits from a repeated allocation, the repeated allocation comprising a portion of the downlink allocation when a quantity of the first type of bits is larger than a quantity of the second type of bits.

15. The method of claim 11, in which the communicating comprises transmitting the repeated bits from a repeated allocation, the repeated allocation comprising multiple repetitions of the downlink allocation when a quantity of the first type of bits is less than a quantity of the second type of bits.

16. The method of claim 11, further comprising transmitting a configuration for a sequence of a repeated allocation when the second type of bits are the repeated bits.

17. The method of claim 11, in which the downlink BWP is non-contiguous, and the method further comprises transmitting a configuration indicating non-contiguous band that includes a repeated allocation when the second type of bits are the repeated bits.

18. The method of claim 11, in which the repeated bits comprise repeated time domain resource allocation (TDRA) bits.

19. The method of claim 11, in which:
    the repeated bits comprise bitmap bits of a Type 0 FDRA.

20. The method of claim 11, in which:
    the repeated bits comprise bits based on a resource indicator value (RIV) indication from a Type 1 FDRA.

21. An apparatus for wireless communication by a user equipment (UE), comprising:
    a memory; and
    at least one processor coupled to the memory, the at least one processor configured:
      to receive a configuration of a downlink bandwidth part (BWP) of a sub-band full duplex (SBFD) slot;
      to receive a frequency domain resource allocation (FDRA) in the sub-band full duplex (SBFD) slot, the FDRA including: a first type of bits corresponding to a downlink allocation within the downlink BWP; and a second type of bits corresponding to either a known sequence or repeated bits; and
      to communicate in the sub-band full duplex (SBFD) slot in accordance with the FDRA.

22. The apparatus of claim 21, in which the known sequence comprises zeroes or a sequence configured to the UE.

23. The apparatus of claim 21, in which the at least one processor is further configured to communicate by receiving the repeated bits from a repeated allocation, the repeated allocation comprising all of the downlink allocation when a quantity of the first type of bits is the same as a quantity of the second type of bits.

24. The apparatus of claim 21, in which the at least one processor is further configured to communicate by receiving the repeated bits from a repeated allocation, the repeated allocation comprising a portion of the downlink allocation when a quantity of the first type of bits is larger than a quantity of the second type of bits.

25. The apparatus of claim 21, in which the at least one processor is further configured to communicate by receiving the repeated bits from a repeated allocation, the repeated allocation comprising multiple repetitions of the downlink allocation when a quantity of the first type of bits is less than a quantity of the second type of bits.

26. The apparatus of claim 21, in which the at least one processor is further configured to receive a configuration for a sequence of a repeated allocation when the second type of bits are the repeated bits.

27. The apparatus of claim 21, in which the downlink BWP is non-contiguous, and the at least one processor is further configured to receive a configuration indicating a non-contiguous band that includes a repeated allocation when the he second type of bits are the repeated bits.

28. The apparatus of claim 21, in which the repeated bits comprise repeated time domain resource allocation (TDRA) bits.

\* \* \* \* \*